United States Patent

[11] 3,624,651

| [72] | Inventors | Andre Charles Robert Eaubonne; Maurice Pierre Rodolphe Gerlach, Saint-Maur, both of France |
| --- | --- | --- |
| [21] | Appl. No. | 814,326 |
| [22] | Filed | Apr. 8, 1969 |
| [45] | Patented | Nov. 30, 1971 |
| [73] | Assignee | Sud-Aviation Societe Nationale de Constructions Aeronautiques Paris, Seine, France |

[54] RADAR RECEIVERS OF THE SUCCESSIVE DETECTIONS TYPE
2 Claims, 9 Drawing Figs.

[52] U.S. Cl. .................................... 343/17.1, 343/13
[51] Int. Cl. .................................... G01s 7/30, G01s 9/06
[50] Field of Search .......................... 343/13, 17.1

[56] References Cited
UNITED STATES PATENTS

| 3,349,395 | 10/1967 | Carre et al. .................... | 343/17.1 |
| 3,423,682 | 1/1969 | Cauchois ........................ | 343/17.1 X |
| 3,438,034 | 4/1969 | Carre et al. .................... | 343/17.1 |

*Primary Examiner*—Malcolm F. Hubler
*Attorney*—Waters, Roditi, Schwartz & Nissen ABSTRACT: The present invention relates to a method of shaping radar signals upon reception, characterized by the fact that it includes the step of subjecting each signal received to successive amplifications and to detections respectively associated thereto, the step of making a first summing of the signals detected up to the penultimate detection, the step of making a second summing of the signals resulting from the first summing and of the signals resulting from the ultimate detection, the step of subjecting the signals resulting from said second summing to a constant time delay, the step of effecting s subtraction operation between the time-delayed signals and the signals resulting from the first summing, and the step of subjecting the signals resulting from said subtraction to a base-clipping and peak-clipping operation whereby to generate usable signals the leading edges of which are produced at instants independent of the amplitude of the signals received and hence, most notably, of the range of the target.

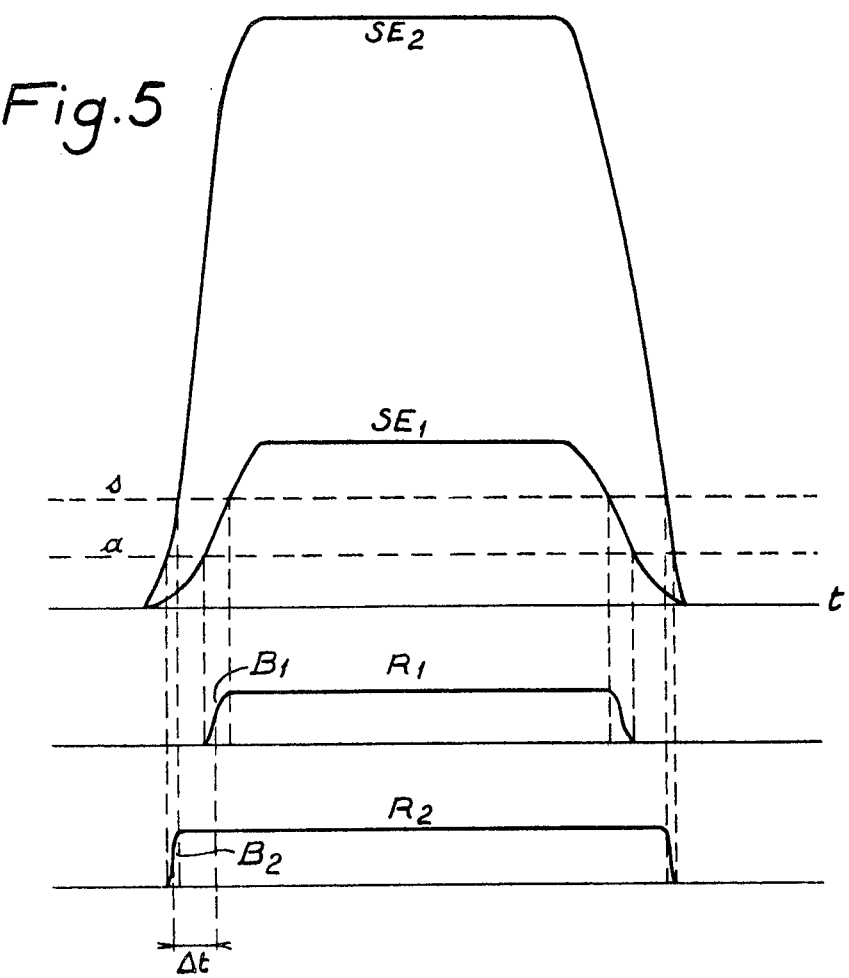
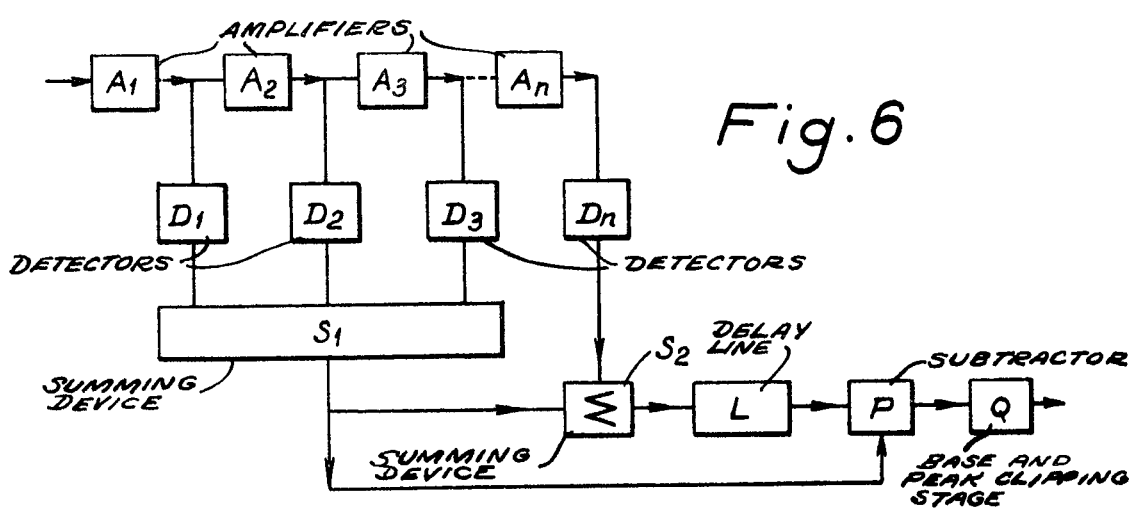

RADAR RECEIVERS OF THE SUCCESSIVE DETECTIONS TYPE

Distance or range measuring devices utilizing electromagnetic echoes, better known as radars, involve emitting electromagnetic pulses and receiving the corresponding echo signals, and then measure the time interval between an emitted signal and the corresponding echo signal at the measuring place. Transmission and reception are usually characterized by a repetition frequency appropriate to the particular application, usually lying in the 20 to 8,000 cycles per second band.

In such measuring devices, the echo signal received, which issues from a reception detector, is compared with a signal resulting from the detection of an attenuated signal picked off the transmission channel.

If the two detected signals being compared have comparable amplitudes, the time elapsing between transmission and arrival of the echo can be measured by clipping the bases and peaks of the signals at any level without introducing a systematic error. For since the two signals have substantially equal amplitudes, the one could be superimposed upon the other if it were shifted along a graph-plotting intensity against time. The magnitude of this shift, which is the same for all amplitudes, represents an unambiguous measurement of the propagation time.

This is not so, however, when the amplitudes are different and exhibit variations, as is the case when the target range varies in vary large proportions. For instance, if an earth satellite is being tracked, the intensity of the echo signal may vary from $-100$ db./w to $-20$ db./w between the apogee and the perigee.

Since the pulses detected both at transmission and reception have finite leading edge slopes, the latter are substantially proportional to the amplitudes. In such cases the corresponding signals can no longer be superimposed upon each other by a shift on a graph of the kind referred to precedingly, and target ranging based on measurements of the time elapsing between the instant when the signal picked off the transmission channel reaches a certain level and the instant when the echo signal reaches the same level embody a systematic error owing to the fact that the instants in time being compared do not correspond to counterpart points on the curves representing these signals.

Also, whereas it is possible to envisage the use of corrective devices based for example on the variation of this systematic error with the amplitude of the echo signal in the case of a radar transmitting signals of known characteristics, on the other hand such devices tend to be imprecise because they operate on the assumption that certain parameters, like transmitting power and pulse shape in particular, remain constant.

The present invention relates to a method and apparatus for overcoming these disadvantages.

The invention includes the steps of subjecting the signal received to successive amplifications, each amplification being associated to a detection process; of effecting a first summing of the signals detected up to the penultimate detection; of effecting a second summing of signals resulting from the first summing and of the signals resulting from the ultimate detection, the signals resulting from this second summing being than subjected to a constant time delay; of effecting a subtraction between the time-delayed signals and those resulting from the first summing; and of base clipping and peak clipping the signals resulting from said subtraction whereby to obtain reception signals having leading edges which are exact counterparts of the leading edges of the transmitted signals, regardless of the target range, thereby avoiding any systematic errors.

The invention further includes apparatus for performing the above-disclosed method, which apparatus includes a first chain of amplifiers and detectors of the successive-detections type and a first summing device, said chain being followed by an amplifying stage having its associated detector connected to a second summing device together with said first summing device, and this second summing device is connected to a delay line applied to a subtractor device which is additionally connected to said first summing device, and a base/peak clipping stage which, regardless of the amplitude of the echo, accordingly supplies a signal the level of which lies within predetermined limits and the leading edge corresponds to a clearly defined counterpart zone of the transmitted signal.

The description which follows with reference to the accompanying nonlimitative exemplary drawings will give a clear understanding of how the invention can be carried into practice.

In the drawings:

FIG. 1 is a schematic graph in which the intensity of high-frequency signal transmitted to a transmitting antenna or received by a receiving antenna is plotted against time.

FIG. 2 correspondingly plots the change in current obtained by detecting signals of the kind in FIG. 1.

FIG. 3 schematically depicts the shape of signals detected off a transmitted-signal sampling and off a received signal, in the case where these two detected signals have substantially identical amplitudes.

FIG. 5 shows on a still more enlarged scale, plots permitting comparisons between the signals actually detected in the case of two different theoretical detected-signal amplitudes.

FIG. 6 is a block diagram of a reception stage according to the invention.

Figure 1:
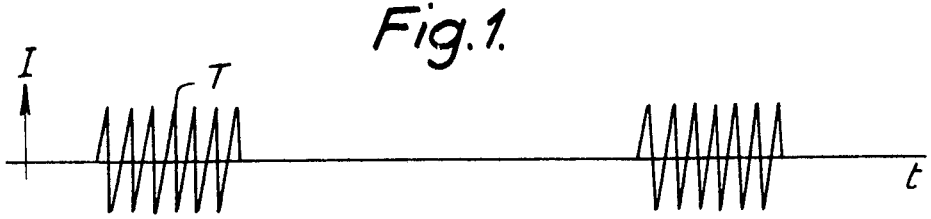

As shown in FIG. 1, the general aspect of the curve representing the change in the radiofrequency intensity I of a radar signal transmitted or received by an antenna, as a function of time $t$, is a train of successive oscillations T.

Figure 2:
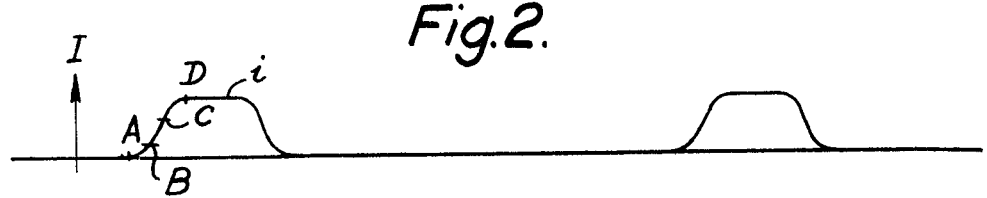

As shown in FIG. 2, detection of these trains T provides unidirectional pulses $i$ which, starting at zero level at a point A, grow substantially exponentially up to a point B, then substantially linearly between points B and C. The slope of the pseudostraight line BC is usually steep, with the intensity reaching its maximum level in the course of a variation between point C and a point D, and the corresponding curve appears as a saturation curve. The downslope of the signal intensity curve is substantially symmetrical with the upslope thereof.

Figure 3:
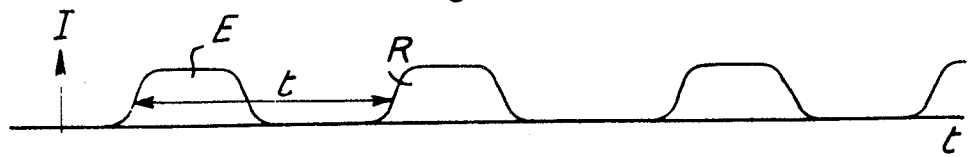

As shown in FIG. 3, in radar devices the target range $d$ is evaluated by measuring the time interval $t$ between a transmitted signal E (represented by its variation in intensity after detection) and the correspondingly detected reception signal R, that is to say the signal which bounces off the target and is picked up by the receiver portion of said radar, then likewise detected.

For the electromagnetic radiation covers the distance between the station and the target twice (from the station to the target and back again) in a total time $t$ and at the speed of light $c$, so that the range is equal to half the product of the speed of light times the time $t$, giving the expression:

$$d = c \cdot t/2$$

It is already known how to measure a time interval with very great accuracy provided that the starting and terminal instants are likewise fixed with great accuracy.

In other words, the real difficulty in accurately measuring the range $d$ resides in materially defining these two instants.

Figure 4:
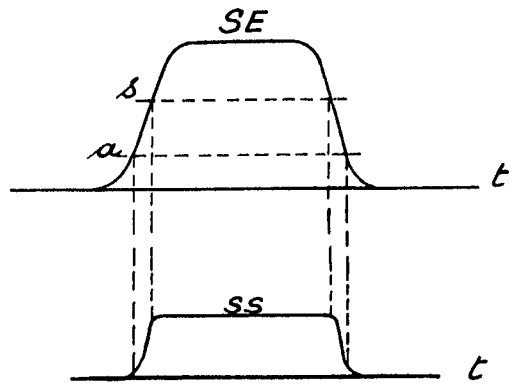
FIG. 4 depicts, firstly, the theoretical detected signals plotted against time and, secondly, also plotted against time, the signal detected under practical conditions in which the detector has both a detection threshold and a saturation level.

In order to give a clearer understanding of the nature of this difficulty, consider the properties of a detector stage with reference to FIG. 4 on which figure the curve SE (input signal) represents the amplitude of the useful portion of the oscillations at the input end of such a detector stage.

As long as this curve does not exceed a certain level $a$ which is the detection threshold, the detector will deliver no output signal. When the signal SE exceeds another level $s$ which is the saturation level of the detector, the output signal SS assumes a constant value known as the saturation value and is independent of the level of the input signal. Thus, there corresponds to the input signal SE an output signal SS the abscissa of whose leading and trailing edges lie within the abscissa of the leading and trailing edges of the signal SE.

If, as shown in FIG. 3, the signal E (transmission) and the signal R (reception) have identical amplitudes, then there is no difficulty in defining the round trip time $t$.

This is not so however when the amplitudes differ and vary markedly.

For instance, when measuring the distance of a satellite from the earth, the intensity of the radar echoes obtained with a given transmitter may vary from $-100$ db./w to $-20$ db./w between the apogee and the perigee of the satellite's orbit.

In FIG. 5 the curve $SE_1$ represents a theoretical input signal (amplitude of radiofrequency oscillations) into a detector, which signal is an echo off a target such as a remote satellite, while the curve $SE_2$ is a similar curve in the case of a nearby target or satellite. These theoretical signals are fed into a detector having a detection threshold $a$ and a saturation level $s$. To the theoretical signal $SE_1$ corresponds a detected signal $R_1$, and to the second theoretical signal $SE_2$ corresponds a detected signal $R_2$.

As is clearly shown in FIG. 5, whereas the two theoretical echo signals $SE_1$ and $SE_2$ have the same origin and the same termination point in time, the detected signals $R_1$ and $R_2$ have origin and termination points at different instants in time. The leading edge $B_1$ and the leading edge $B_2$ are separated by a time lapse $\Delta t$ that represents a systematic error in any evaluation of the round trip time $t$ and hence of the target range $d$, and this systematic error depends on the amplitude of the echo signal. The positions of the leading edge, and indeed the trailing edge, of the detected signals in neither case correspond with the same portions of the upslope and downslope of the theoretical input signal into the detector.

Because they have similar threshold and saturation level properties, the amplifier stages also give rise to errors similar to the one discussed precedingly in connection with a detector, and these further errors are likewise corrected by means of the present invention.

In order to obtain a detected echo signal which is a faithful reflection of the corresponding transmitted signal, i.e. which is the equivalent of a detected echo signal having had its amplitude constrained within narrow limits in order to eliminate any systematic errors due to variations in the amplitude of said echo signal, use is made of a receiver of which a block diagram appears in FIG. 6 and which includes, at the output end of a conventional frequency changing stage (not shown), an amplification chain comprising successive stages $A_1$, $A_2$, $A_3$, ... $A_n$. Each of these stages is connected to the subsequent stage and also to an associated detector $D_1$, $D_2$, $D_3$, ... $D_n$, respectively.

Detectors $D_1$, $D_2$, ... $D_{n-1}$ are connected to a first summing device $S_1$.

The ultimate detector $D_n$ is connected, like the first summing device $S_1$, to a second summing device $S_2$. The latter is in turn connected, via an interposed delay line L, to a subtractor P which is likewise connected to the output of first summing device $S_1$, the output of subtractor P being connected to a base and peak clipping stage Q, from the output of which the required signals issue.

The mutually identical amplifier and detector stages are of the kind used in so-called logarithmic amplifier systems with successive detections.

The specific operating characteristics of the system as hereinbefore described result from the fact that the signal obtained by summings and injected into the delay line L is thereby time shifted by a constant amount, whereas the difference obtained in subtractor P provides a signal which, after being base and peak clipped, is used as a conventional radar echo signal but which offers a level of accuracy that stems from the manner in which it was generated.

Figure 7A:
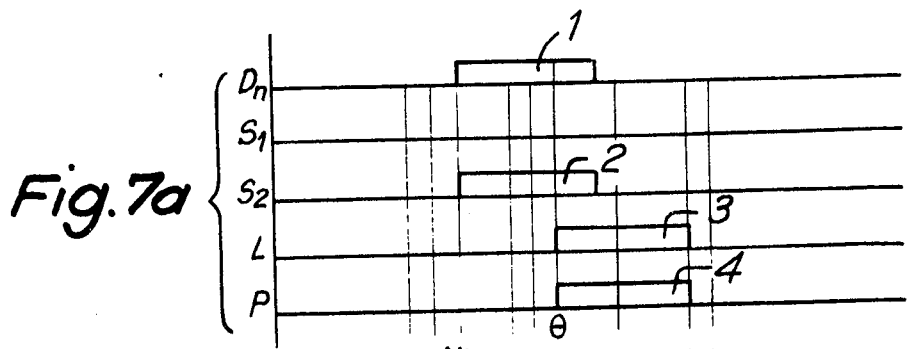
FIGS. 7a, 7b and 7c are a set of explanatory diagrams of operation of the apparatus according to this invention.
Figure 7B:
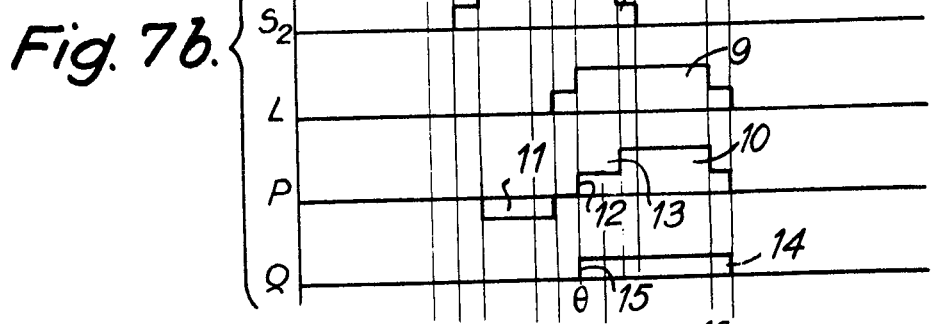
Figure 7C:
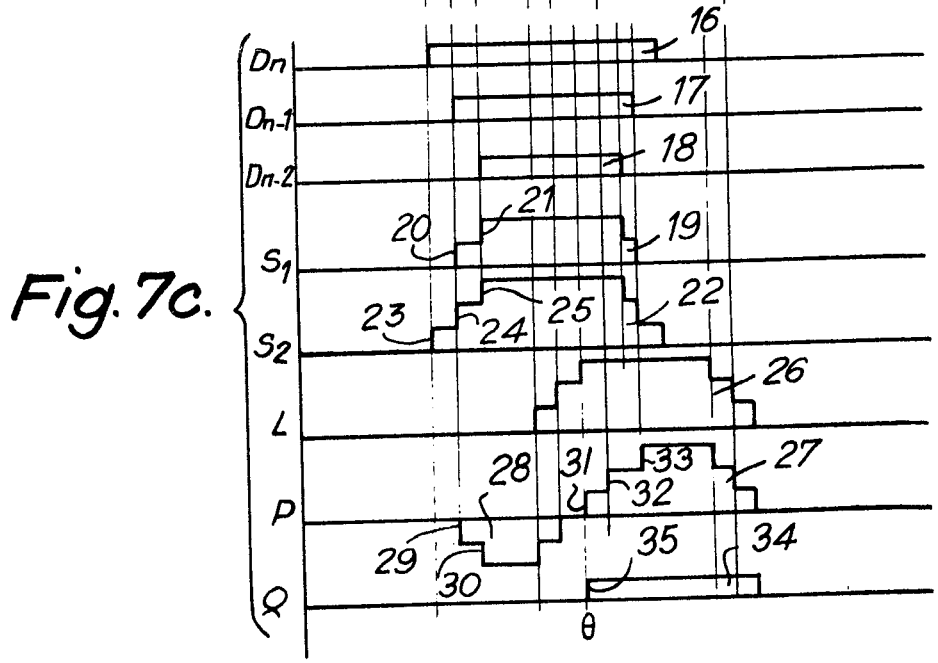

Reference is now had to FIGS. 7a, 7b and 7c, which provide an explanation thereof and in which it has been assumed that the signals delevered by the various detectors have very steep fronts (corresponding to the customary concept of so-called "square" signals). Considering first FIG. 7a, it can be assumed that the echo is very weak and that the corresponding input levels in detectors $D_1$, $D_2$, ... $D_{n-1}$ are below the common detection threshold $a$. Only the detector $D_n$ produces a signal 1 suitable amplitude. Summing device $S_1$ then delivers no signal. Summing device $S_2$ delivers a signal 2 corresponding to signal 1 and, after being time shifted by delay line L, this signal produces at the output of delay line L an identical signal 3 which the subtractor P respects by delivering an output signal 4 having an amplitude close to the limit permitted by the saturation of detector $D_n$, and a leading edge of clearly defined time origin $\theta$.

Consider next in FIG. 7b the corresponding case of an echo of slightly increased level exceeding the threshold of detector $D_{n-1}$ at the input thereof, without response as yet from detector $D_{n-2}$. By deliberately exaggerating the time shifts in the drawing for a clearer understanding of the explanation which follows, reference may be had to the situation discussed with reference to FIG. 5, wherein the front or leading edge of a detected signal leads by $\Delta t$ due to the corresponding increase in amplitude.

This explains why detector $D_n$ supplies a signal 6 whose front leads by $\Delta t$ that of the signal 7 delivered by detector $D_{n-1}$, this signal 7 being the equivalent of signal 1 described precedingly, which was then delivered by the detector $D_n$. The first summing device $S_1$ delivers an output signal which is an exact reproduction of signal 7, and second summing device $S_2$ delivers a signal 8 having a stepped front and which is the sum of signals 6 and 7. The signal 9 delivered by delay line L is a time-shifted reproduction of signal 8. Subtractor P deducts signal 7 from signal 9 and produces a signal 10 consisting first of a negative amplitude 11, a zero value, and initial leading edge 12 which in terms of time corresponds to the second leading edge portion of signal 9, followed by a second leading edge 13 which in time corresponds to the trailing edge of signal 7.

The base and peak clipping stage Q delivers a signal 14 obtained from signal 10, from which latter signal is eliminated the portion corresponding to negative amplitude 11 and that corresponding to the second leading edge portion 13, whereby signal 14 exhibits a single leading edge 15 at the instant $\theta$ that corresponds to the instant at which appears the leading edge of the signal 7 generated in first summing device $S_1$, with the timelag added by line L.

An examination of the figures shows that, in the second case, detector $D_{n-1}$ finds itself in the same situation as detector $D_n$ in the first case ans delivers a signal 7 which is an exact reproduction of signal 1.

As may be seen, signal 14 is extended in relation to signal 4, but the leading edge 15 appears at the same instant $\theta$ as the leading edge of signal 4.

Considering next the case of FIG. 7c, in which the level of the echo is still further increased, the detection threshold is crossed in the case of detector $D_{n-2}$, and necessarily therefore in the case of detectors $D_{n-1}$ and $D_n$. From their outputs issue signals 16, 17 and 18 of decreasing durations. The first summing device $S_1$ produces a signal 19 which is the sum of signals 17 and 18 and has two leading edges 20 and 21. The second summing device $S_2$ produces a signal 22 which is the sum of signal 19 and signal 16 and consequently exhibits three stepped leading edges 23, 24 and 25. Delay line L time shifts the signal 22 by a constant amount to furnish an identical signal 26.

Subtractor P subtracts from signal 26 the signal 19 issuing from summing device $S_1$ and produces a signal 27 having a reverse amplitude 28 with two leading edge portions 29 and 30, followed by a zero value and finally a positive amplitude with three stepped leading edges 31, 32 and 33. The base and peak clipping stage Q eliminates the amplitude 28 and the portions beginning at leading edges 32 and 33, leaving only a signal 34 the leading edge 35 of which again appears at the instant $\theta$, which is the time at which appears the leading edge of the signal issuing from the first signal-passing detector, i.e. the one which has received an input signal of intensity greater than the detection threshold, said time being lengthened by the delay imposed by line L.

An inspection of the figure shows that the instant $\theta$ remains constant regardless of the number of sensitized detectors and regardless of the rank of the first one thereof to be sensitized. Manifestly, operation of the system could be analyzed in detail step by step all the way up to detector $D_1$, but the conclusion hereinabove set forth would remain valid.

Whereby the above-described system possesses the property of delivering a pulse which is detected and possibly base and peak clipped, the leading edge of which corresponds with the leading edge of a pulse that produced an echo signal having an amplitude in excess of the detection threshold and equal to or below the saturation level of a stage in the system. In consequence, the leading edge of an echo lying within such limits will be unaffected by the systematic errors precedingly designated by $\Delta t$ with reference to FIG. 5.

A cursory examination of FIGS. 7a, 7b and 7c could suggest an apparent substantial shift in the signal times when the amplitude of the echo signal increase and could lead to the assumption that satisfactory operation is contingent upon very riding compatibility requirements between the signal widths, the time delay produced by the line L, and the leading edges of the signals transmitted. This is because, for a clear understanding of the explanations and the figures, it was necessary to exaggerate the magnitude of the shifts and the extent of the systematic error—due to the signal widths—from one reception level to another. In practice these shifts are very small and the compatibility requirements are naturally met provided one adopts the signal widths customary on most radars (approximately 1 microsecond) and a delay line L producing a time delay of less than one-quarter of said signal width.

It goes without saying that many changes may be made in the forms of embodiment and in the steps of the method hereinbefore described, without departing from the scope of the invention.

What is claimed is:

1. A method of shaping radar signals upon reception, comprising the steps of successively amplifying and detecting each signal received, first summing the signals detected up through the penultimate detection, second summing of the signals resulting from the first summing and of the signals resulting from the ultimate detection, subjecting the signals resulting from said second summing to a constant time delay, subtracting the time-delayed signals from the signals resulting from the first summing, and base clipping and peak clipping the signals resulting from said subtraction to generate signals having leading edges which are produced at times independent of the amplitude of the signals received.

2. Apparatus for shaping radar signals upon reception comprising a chain of successive amplifiers and detectors, said amplifiers being connected in series, each of said detectors being connected to the output of a respective amplifier, the output of each of said detectors being electrically connected to the input of a first summing device, a second summing device, said chain having an output last amplification and detection stage having an input connected to the output of said chain, said last amplification and detection stage and said first summing device electrically connected to said second summing device, a delay line and a subtractor device, said second summing device being electrically connected through said delay line to said subtractor device, and said subtractor device being electrically connected to the output of said first summing device, a base and peak-clipping stage connected to the output of said subtractor device and producing usable signals.

* * * * *